United States Patent
Chiu et al.

(10) Patent No.: US 9,042,495 B2
(45) Date of Patent: May 26, 2015

(54) CONVERGENCE DURING INTERFERENCE SUPPRESSION

(75) Inventors: Fu-Hsuan Chiu, Fords, NJ (US); Chun-Hsuan Kuo, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/560,095

(22) Filed: Jul. 27, 2012

(65) Prior Publication Data

US 2014/0029706 A1    Jan. 30, 2014

Related U.S. Application Data (60) Provisional application No. 61/618,049, filed on Mar. 30, 2012.

(51) Int. Cl.
*H04B 1/7107* (2011.01)

(52) U.S. Cl.
CPC .................................. *H04B 1/71075* (2013.01)

(58) Field of Classification Search
CPC .. H04B 7/0617; H04B 7/0619; H04B 7/0669; H04B 7/0678; H04B 7/10; H04B 1/10; H04B 2001/70935; H04B 1/71075; H04B 1/7103; H04B 1/709; H04B 1/712; H04B 1/7105; H04B 1/7107; H04B 1/71072; H04B 1/71052; H04B 1/711; H04B 2201/70702; H04B 7/086; H04B 15/00; H04B 17/006; H04L 1/005; H04L 2025/03375; H04L 25/03006; H04L 1/0057; H04L 1/1819; H04L 25/03012; H04L 25/0328

USPC ......... 375/262, 270, 272, 289, 295, 298, 306, 375/316, 320, 322, 340–344, 346, 347, 348, 375/350
See application file for complete search history.

(56) References Cited

U.S. PATENT DOCUMENTS

| | | | |
|---|---|---|---|
| 6,661,835 B1 * | 12/2003 | Sugimoto et al. ............. | 375/148 |
| 7,386,032 B2 * | 6/2008 | Fitton et al. .................... | 375/147 |
| 8,218,697 B2 * | 7/2012 | Guess et al. .................. | 375/346 |
| 8,416,674 B2 * | 4/2013 | Lee et al. ....................... | 370/204 |
| 8,665,693 B1 * | 3/2014 | Cheng et al. .................. | 370/204 |
| 2004/0120299 A1 * | 6/2004 | Kidiyarova-Shevchenko et al. ............................. | 370/342 |
| 2004/0123227 A1 * | 6/2004 | Lee et al. ....................... | 714/792 |
| 2008/0043680 A1 * | 2/2008 | Fitton ........................... | 370/335 |
| 2011/0058598 A1 * | 3/2011 | Gaur ............................. | 375/233 |

(Continued)

FOREIGN PATENT DOCUMENTS

TW    201105052 A    2/2011

OTHER PUBLICATIONS

European Search Report in co-pending, related EP Application No. 13001289.1, mailed Jul. 17, 2013.

(Continued)

*Primary Examiner* — Hirdepal Singh
(74) *Attorney, Agent, or Firm* — McDermott Will & Emery LLP (57) ABSTRACT

In one embodiment, interference suppression is improved by improving convergence criteria. For some embodiments, convergence is improved by employing non-constant alpha-beta-weighting. For other embodiments, convergence is improved by employing successive interference suppression methods that have guaranteed convergence properties.

21 Claims, 8 Drawing Sheets

(56) References Cited

U.S. PATENT DOCUMENTS

2011/0200151 A1* 8/2011 Guess et al. ............... 375/346
2013/0077670 A1* 3/2013 Wang et al. ............... 375/233

OTHER PUBLICATIONS

Fang, et al., "Improved Linear Multiuser Detector for Synchronous Code-Division Multiple-Access Communication Systems", Emerging Technologies: Frontiers of Mobile and wireless Communication, 2004, Proceedings of the IEEE 6th Circuits and Systems Symposium, Piscataway, NJ, USA, vol. 2, May 31, 2004, pp. 787-790.

Yang, et al., "A Novel Approach for Interference Cancellation of DS-CDMA Systems Using Projected successive Overrelaxation Algorithm", Information Communications and Signal Processing, 2003 and Fourth PAC IFIC RIM Conference on Multimedia, Proceedings of the 2003 Joint Conference of the Fourth International Conference on Singapore, Dec. 15-18, 2003, vol. 1, pp. 641-644.

Li, et al., "Decision Feedback Partial Parallel Interference Cancellation for DS-CDMA," IEEE MILCOM 2000, Oct. 2000, pp. 579-582.

* cited by examiner

CONVERGENCE DURING INTERFERENCE SUPPRESSION

CROSS-REFERENCE TO RELATED APPLICATION

This application is a utility application that claims priority to U.S. Provisional Patent Application entitled, "Cellular Baseband Processing", having Ser. No. 61/618,049, filed Mar. 30, 2012.

U.S. patent application Ser. No. 12/582,771, having the title "Method and System for Interference Suppression in WCDMA," by Hahm, et al., and filed on 2009 Oct. 21 ("the PRISM reference"); and U.S. patent application Ser. No. 13/560,052, having the title "Suppressing Intra-Cell Interference," by Kuo, et al., and filed [concurrently with this application].

BACKGROUND

1. Field of the Disclosure

The present disclosure relates generally to signal processing and, more particularly, to interference suppression.

2. Description of Related Art

Wireless devices have become ubiquitous. As the number of wireless users and as the number of wireless applications increase, the demands on wireless networks increase correspondingly. Due to the demands on these networks, there are ongoing efforts to enhance performance.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Wireless devices, such as cellular devices (e.g., telephones, personal digital assistants (PDA), tablets, laptop computers, etc.), have become commonplace. As the number of wireless users and the number of wireless applications increase, the demands on wireless networks increase correspondingly. Specifically, for cellular devices, the processing demands in cells continue to increase. These processing demands include the ability of a particular cell to suppress noise or interference.

Currently, there exist devices that suppress or cancel interference in a cell. These devices include, for example, PRogrammable Interference Suppression Modules (PRISM) by Broadcom Corp., which are disclosed in U.S. patent application Ser. No. 12/582,771, having the title "Method and System for Interference Suppression in WCDMA," by Hahm, et al., and filed on 2009 Oct. 21 ("the PRISM reference"), which is incorporated herein by reference as if expressly set forth in its entirety. As shown in the PRISM reference, interference suppression is important in cellular environments because signal integrity is a function of interference. In other words, as noise (which is random Gaussian) or interference (which is not random Gaussian) increases, the integrity of the signal diminishes. Thus, as shown in the PRISM reference, complicated matrix-based algorithms are implemented to minimize the effects of interference.

Since interference suppression is important, and since signal processing associated with interference suppression is not trivial, there are ongoing efforts to improve both the hardware architecture for interference suppression, as well as ongoing efforts to improve the interference-suppression processes. This disclosure is directed to various embodiments of modules and processes that improve interference suppression.

With that said, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

A. Intra-Cell Interference Suppression

The PRISM reference teaches various interference-suppression approaches. However, the focus of certain embodiments in the PRISM reference is on inter-cell interference suppression. For example, the PRISM reference teaches that, at a given rake finger, the interference signal energy from other base stations (or cells) degrades the desired signal and, hence, matrix-based algorithms are used to cancel or suppress those interference signals.

Unfortunately, in addition to interference from other cells, the desired signal within a cell is also degraded by interference from within the same cell. This is referred to as intra-cell interference. Cancellation of intra-cell interference further improves the integrity of the desired signal. However, conventional interference-suppression approaches do not take into account intra-cell interferences upstream from the chip-level equalizer. Instead, the intra-cell interference continues to be a part of the signal and may only be later addressed (downstream) by the chip-level equalizer. Stated differently, conventional approaches focus on inter-cell interference suppression, and any intra-cell interference is suppressed downstream at the chip-level equalizer.

To the extent that the intra-cell interference remains unaddressed until the downstream chip-level equalizer, this unaddressed interference adds a processing cost to the downstream chip-level equalizer. In view of this processing cost to the downstream chip-level equalizer, there is room for improvement.

Figure 1:
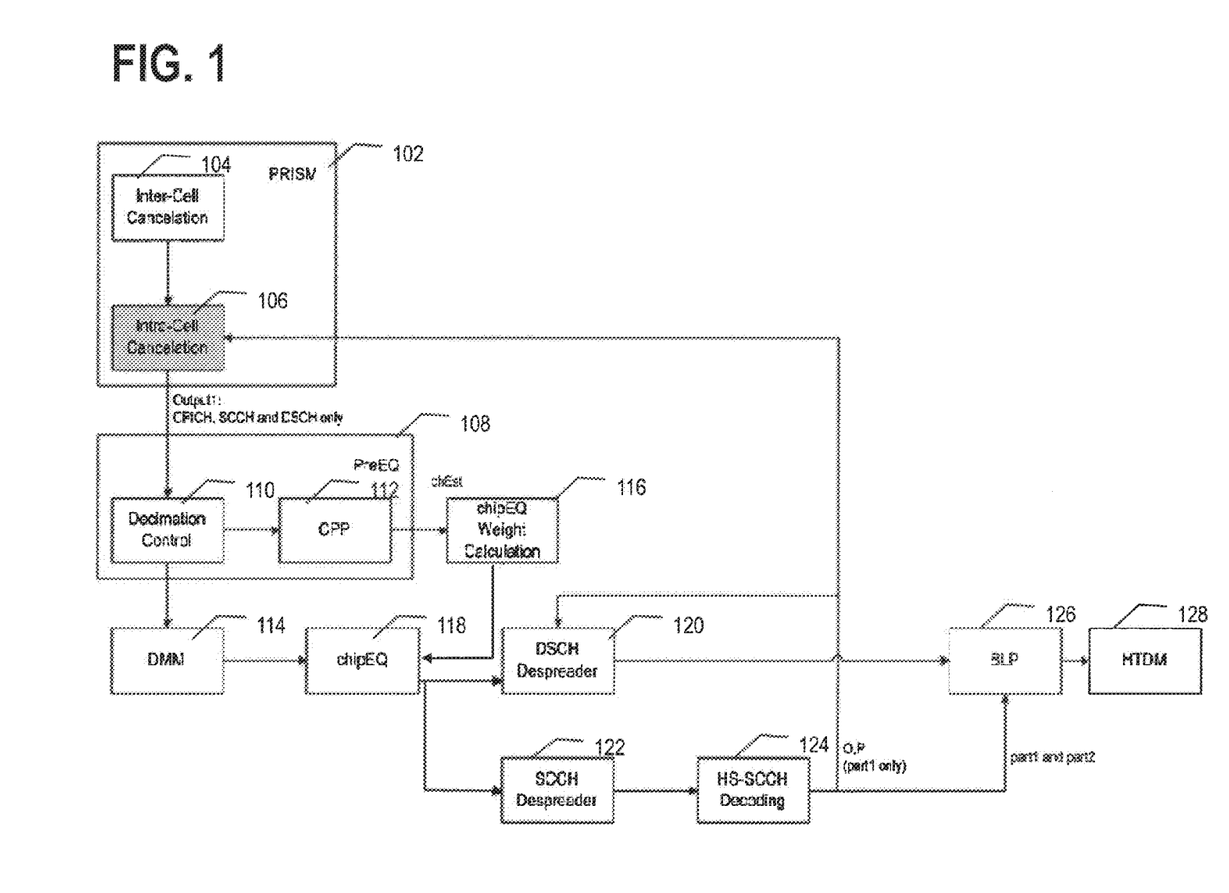
FIG. 1 is a block diagram showing relevant processing modules in a cell comprising a PRogrammable Interference Suppression Module (PRISM) with an intra-cell cancellation module.
Figure 2:
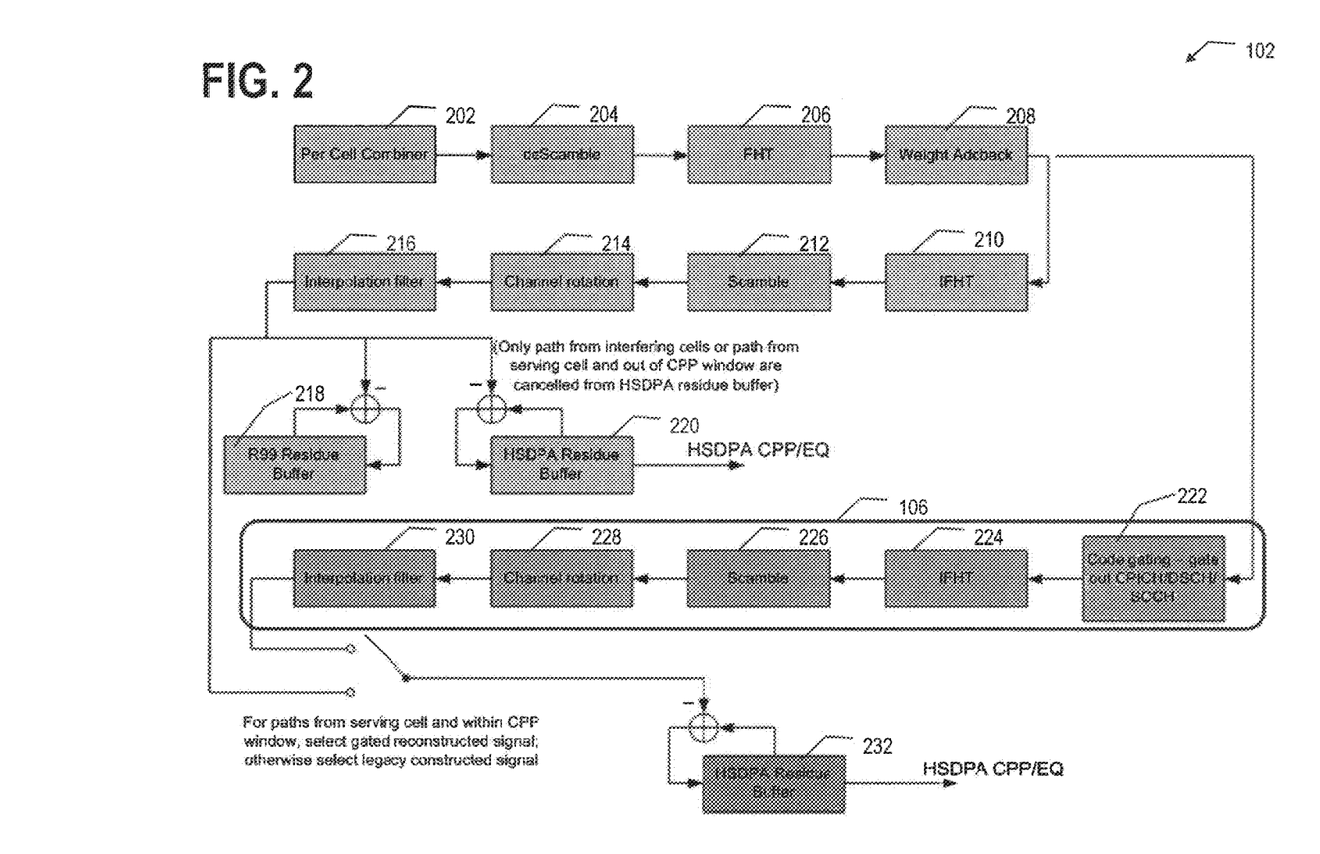
FIG. 2 is a block diagram showing relevant processing modules for both inter-cell cancellation and intra-cell cancellation in the PRISM of FIG. 1.
Figure 8:
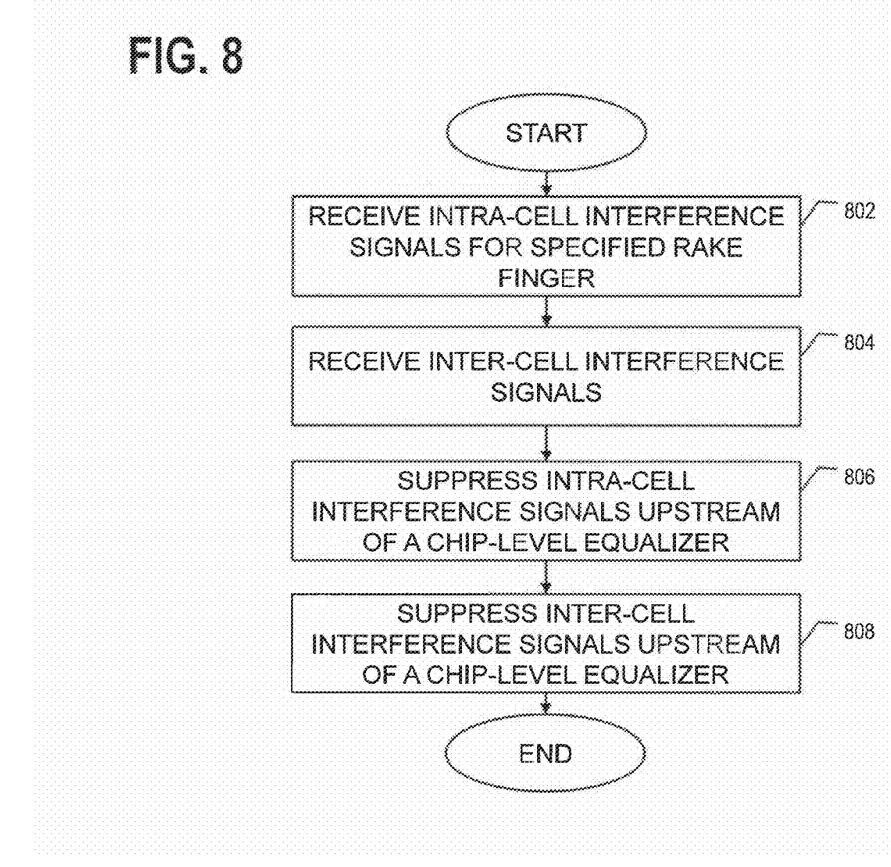
FIG. 8 is a flowchart showing one embodiment of a method for suppressing interference signals.

The embodiments of FIGS. 1, 2, and 8 show example approaches to intra-cell interference suppression that can be employed within PRISM by modifying a conventional PRISM to include an intra-cell interference suppression module. Indeed, the embodiments of FIGS. 1 and 2 are amenable to implementation in any wireless environment, including those that have inter-cell interference-suppression capabilities but leave intra-cell interference suppression for downstream processing.

Briefly, in certain embodiments, intra-cell interference suppression is accomplished by supplementing a pre-existing inter-cell cancellation (or suppression) module with an intra-cell cancellation (or suppression) module within the same PRISM, such that any inter-cell interference is cancelled by the pre-existing inter-cell suppression module, while the intra-cell interference is cancelled by the newly-added intra-cell suppression module. By implementing a dual-path structure (one for inter-cell interference; another for intra-cell interference), a higher-integrity signal emerges from the PRISM, thereby reducing the processing cost at the downstream equalizer.

FIG. 1 is a block diagram showing relevant processing modules in a cell comprising a modified PRogrammable Interference Suppression Module (PRISM) 102 with an intra-cell cancellation module 106. While the cell comprises additional components, which are not shown in FIG. 1, for purposes of more-clearly illustrating how the cell suppresses intra-cell interference, only relevant components within the cell are shown in FIG. 1. In other words, only those components that aid in the understanding of the intra-cell interference suppression mechanism are shown in FIG. 1. Thus, those having skill in the art will appreciate that the cell of FIG. 1 is not strictly limited to the components that are illustrated in FIG. 1.

As shown in FIG. 1, the cell comprises a feedback loop where the PRISM 102, which now comprises both an inter-cell cancellation module 104 (also referred to herein as inter-cell interference suppression module, or inter-cell suppression module) and an intra-cell cancellation module 106 (also referred to herein as intra-cell interference suppression module, or intra-cell suppression module), receives part of its input from a High-Speed (HS) Shared Control CHannel (SCCH) decoding module 124. The intra-cell suppression module 106 uses the feedback from the HS-SCCH decoding module 124 to suppress the intra-cell interference. Various components within the intra-cell interference suppression module 106 are shown in greater detail with reference to FIG. 2, below.

Continuing with FIG. 1, the PRISM 102, which comprises both the inter-cell cancellation module 104 and the intra-cell cancellation module 106, outputs a signal that comprises Common PIlot CHannel (CPICH) information, Shared Control CHannel (SCCH) information, and Downlink Shared CHannel (DSCH) information. That output signal is conveyed to a pre-equalization (pre-EQ) module 108, which comprises a decimation control unit 110 and a Cluster-Path-Processor (CPP) 112. The decimation control unit 110 controls the sampling timing and the CPP 112 performs channel estimation of consecutive half-chip-spaced or chip-spaced paths. The CPP 112 provides a CHannel ESTimate (ChEst) to a chip-level equalization (chipEQ) weight calculation module 116, which calculates appropriate weights for subsequent use. Additionally, the pre-EQ module 108 outputs to a Delay Match Module (DMM) 114, which is a memory responsible for matching the signal delay from the decimation control unit 110 so that the ChEst delay experienced as a result of the channel estimation filtering at the CPP 112 can be compensated. The delay matched signal from the DMM 114 and the weights from the chipEQ weight calculation module 116 are received at the chip-level equalization (chipEQ) module 118, which equalizes the signal and then passes that equalized signal to a DSCH despreader 120 and a SCCH despreader 122.

The SCCH despreader 122 in conjunction with an HS-SCCH decoding module 124 decodes control channel information and generates the code allocation of HS-DSCH that is eventually fed back into the PRISM 102, where the intra-cell interference suppression module 106 uses the code allocation information to suppress the intra-cell interference.

The output of the HS-SCCH decoding module 124 is also conveyed to the DSCH despreader 120, which performs HS-DSCH despreading using that information in conjunction with the equalized signal from the chipEQ 118. The DSCH despreader 120 and the HS-SCCH decoding module 124 both feed into a bit-level processor (BLP) 126, which processes the signal and passes it to a HSDPA Turbo Decoder Module (HTDM) 128. As one can see from FIG. 1, by installing an intra-cell cancellation module 106 within the PRISM 102, the cell can perform intra-cell interference suppression before the equalization stage, thereby reducing downstream processing costs.

FIG. 2 is a block diagram showing relevant processing modules for both inter-cell cancellation and intra-cell cancellation in the PRISM 102 of FIG. 1. Specifically, relevant components within the inter-cell cancellation module and relevant components within the intra-cell cancellation module 106 are shown in FIG. 2.

As noted above, in conventional cells, the PRISM 102 has a Wideband Code Division Multiple Access (WCDMA) per-path output and an High-Speed Downlink Packet Access (HS-DPA) output where, in the HSDPA path, inter-cell interference is suppressed by the PRISM 102 and intra-cell interference is left for the equalizer to handle downstream. Thus, during conventional PRISM iterations, the estimated signal is: (a) reconstructed from the PRISM per-cell module; (b) fed into the subtraction module; and (c) subtracted from the R99 residue buffer 218. Conventionally, HSDPA residue buffer 220 comprises the signal that mirrors the R99 residue buffer 218, but with a specified rake finger output not cancelled from the HSDPA residue buffer 220. At the end of the conventional PRISM operation, the HSDPA PRISM output is generated by interpolating the residue buffer output.

Unlike these conventional approaches, in the embodiment of FIG. 2, the output of the weighting-and-addback module 208 is split and conveyed to both the conventional inter-cell reconstruction modules 210, 212, 214 and, also, to the intra-cell interference cancellation module 106. By way of explanation, in HSDPA, the user equipment (UE) knows the channel allocation of the HS-SCCH channel, which is signaled by the network. From the HS-SCCH channel, the UE receives channel allocation information of the HS-DSCH channels. Knowing that information, FIG. 2 shows one embodiment that permits removal of unwanted channels (or inter-cell interference) from the specified rake fingers.

As shown in the embodiment of FIG. 2, this split-path enables the PRISM 102 to perform both inter-cell interference suppression and intra-cell interference suppression, thereby alleviating some of the downstream processing of the equalizer.

The components within the inter-cell cancellation module 104 include a per-cell combiner 202, a descrambler 204, a Fast Hadamard Transform (FHT) module 206 (also known as a Fast Walsh Transform module), a weighting-and-addback module 208, an Inverse Fast Hadamard Transform (IFHT) module 210, a scrambler 212, a channel rotation module 214, an interpolation filter 216, an R99 residue buffer 218, and a HSDPA residue buffer 220. It should be noted that while a FHT is used for illustrative purposes, other types of transforms can be readily substituted for the FHT and the IFHT, depending on the communications protocols.

Explaining example operations in terms of the components within FIG. 2, the per cell combiner 202 provides the channel information (designated as a function, H), the descrambler 204 provides the scrambling information (designated as a function, S), and the FHT module 206 provides the orthogonal variable spreading factor (OVSF) information (designated as a function, C). Together the H (channel) S (scrambling) C (OVSF) provides a rough estimate of a symbol, designated as $R^H$. The weighting-and-addback module 208 provides an estimate of a current symbol by providing the appropriate weighting and adding back the corresponding signal components.

Continuing, the inter-cell interference suppression pathway comprises the IFHT module 210, the scrambler 212, and the channel rotation module 214 (which performs the inverse functions of the FHT module 206, the descrambler 204, and the per-cell combiner 202, respectively) to reconstruct the signal, R=HSC. R is provided to the interpolation filter 216 for eventual use by the R99 residue buffer 218 and the HSDPA residue buffer 220 for inter-cell interference suppression.

The components within the intra-cell cancellation module 106 include a code gate 222, which gates out the CPICH, DSCH, and SCCH information. In other words, the code gate 222 gates out the information from the particular rake finger of interest so that the interference reconstruction process does not consider the signal-of-interest to be an interference signal. Upon code-gating, the IFHT 224 module, the scrambler 226, and the channel rotation module 228, in combination, reconstruct the symbol, R=HSC, for the intra-cell interference, and thereafter the interpolation filter 230 provides an estimate of the intra-cell interference signal.

Speaking generally, the intra-cell interference suppression pathway removes all unrelated HSDPA channels from the HSDPA residue buffer 232. Thereafter, the per-finger signal is constructed and removed from the HSDPA residue buffer 232. For the fingers from interfering cells, or from serving cells that are outside of the equalization window, the conventional inter-cell cancellation pathway is selected to remove all estimated interfering channels. Conversely, the intra-cell pathway is selected to remove all estimated interfering channels that are identified as being intra-cell interference.

This dual-pathway within the PRISM 102 allows for removal of both inter-cell interference and intra-cell interference prior to equalization. Thus, as one can see from the embodiments of FIGS. 1 and 2, suppression of intra-cell interference results in a higher-integrity signal emerging from the PRISM 102 (or other similar processing module), thereby reducing the downstream processing cost at the equalizer.

For clarity, reference is made to FIG. 8, which shows a flowchart of one embodiment of a method for suppressing interference upstream of a chip-level equalizer. As shown in FIG. 8, this embodiment of the process comprises the steps of receiving 802 intra-cell interference signals for a specified rake finger, and receiving 804 inter-cell interference signals. For some embodiments, the inter-cell interference signals are substantially uncorrelated to the specified rake finger. Upon receiving 802, 804 the interference signals, the process then suppresses 806 the intra-cell interference signals before it reaches a chip-level equalizer. In other words, the intra-cell interference signals are suppressed upstream of the chip-level equalizer. Additionally, the process suppresses 808 the inter-cell interference signals at a point that is upstream of the chip-level equalizer.

B. Reducing Processing Complexity and Improving Convergence in Interference Suppression Another way that conventional devices can be refined is by improving the processes by which the interference is suppressed. Current approaches to interference suppression utilize complicated matrix-based approaches. For example, the approaches described in the PRISM reference utilize Jacobi-based iterations to invert matrices. Specifically, those conventional approaches solve for a minimum mean-square-error (MMSE) for the equation:

$$\hat{b}=(R^H R+\sigma^2 A^{-2})^{-1}R^H y, \quad \text{[Eq. 1]}$$

where $R^H$ and R are functions of HSC (as noted above with reference to FIG. 2), A represents a diagonal matrix with diagonal entries as amplitude of the transmitted symbol, y represents a vector of received chip-level signals, $\hat{b}$ represents the detected symbol, and $\sigma^2$ represents the noise variance.

The Jacobi-based iterations are represented by:

$$D=\text{Diag}(R^H R+\sigma^2 A^{-2}), \quad \text{[Eq. 2]}$$

where:

$$b_{n+1}=D^{-1}(R^H y-(R^H R+\sigma^2 A^{-2}-D)b_n), \quad \text{[Eq. 3]}$$

which can be re-written as:

$$b_{n+1}=D^{-1}(R^H(y-Rb_n)+b_n). \quad \text{[Eq. 4]}$$

If the residue buffer is initialized by y, then:

$$r_n=r_{n-1}-R(b_n-b_{n-1}), \quad \text{[Eq. 5]}$$

where r represents the vector of the residue buffer. From Eq. 5, the recursive values for b are shown to be:

$$b_{n+1}=D^{-1}(R^H r_n+b_n). \quad \text{[Eq. 6]}$$

Unfortunately, with the Jacobi-based approaches, the matrix is not strictly diagonal-dominated. Hence, the matrix-inversion operation may not properly converge.

Some have proposed that the shortcomings surrounding convergence can be mitigated by employing an alpha-beta sequence that is based on an eigenvalue decomposition followed by a complicated optimization process to determine the alpha-variable and the beta-variable. Unfortunately, the processing resources that are needed to perform these eigenvalue decompositions and complex optimizations are quite extensive.

Figure 3:
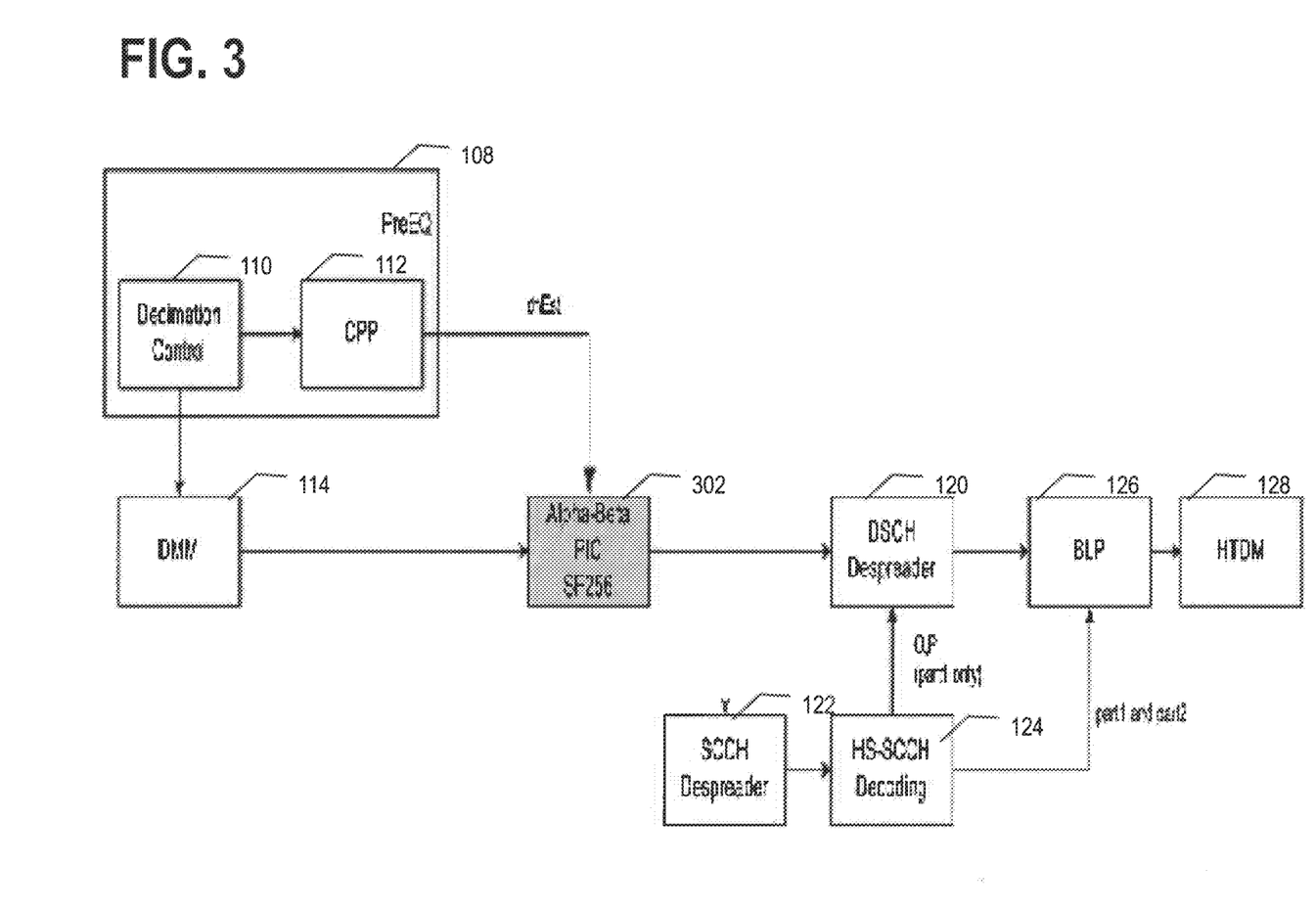
FIG. 3 is a block diagram showing relevant processing modules in a cell that employs a variable-weight-based alpha-beta parallel interference cancellation (PIC) module.
Figure 4:
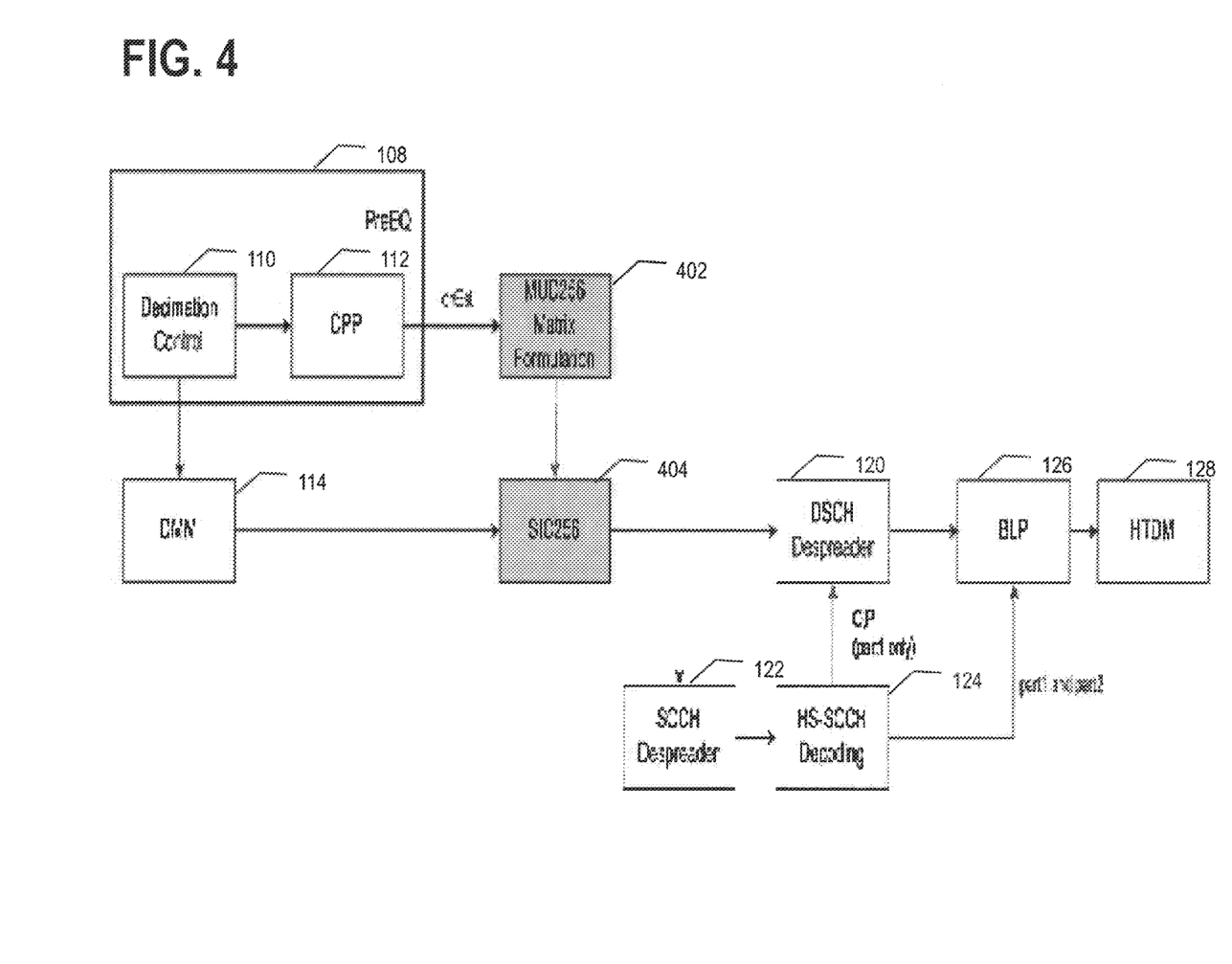
FIG. 4 is a block diagram showing relevant processing modules in a cell that employs a successive interference cancellation (SIC) module.
Figure 5:
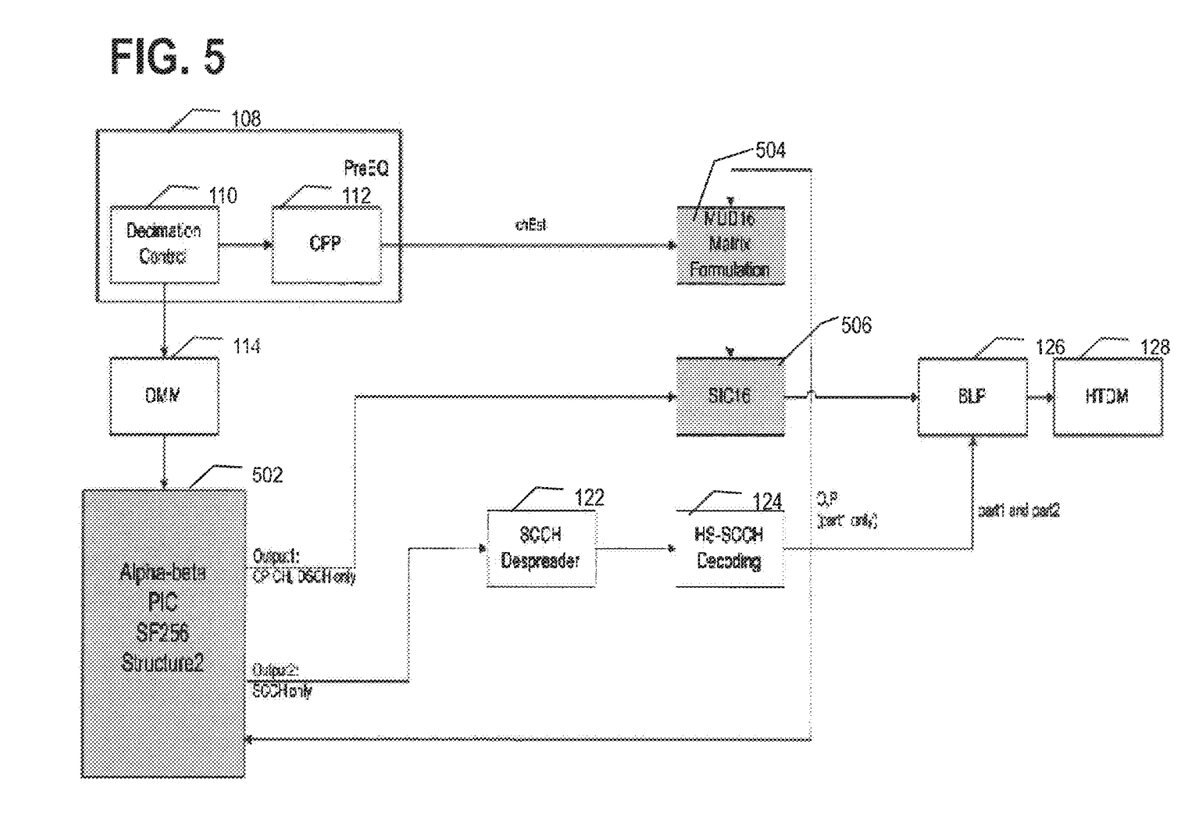
FIG. 5 is a block diagram showing relevant processing modules in a cell that comprises a PIC module and a SIC module.

As such, there exists a need to simplify the processing and, also, to employ a process that is less susceptible to the shortcomings related to convergence. FIGS. 3 through 5 show various approaches that seek to address these shortcomings.

1. Variable-Weight-Based Alpha-Beta Interference Suppression

As discussed above, traditional Jacobi-based iterations to solve for inverse matrices cannot guarantee convergence of the interference-suppression algorithm. The reason is because those approaches apply a constant weighting factor during all of the iterations in the signal-estimation process. The constant-weighting-factor approach does not guarantee convergence of the cancellation algorithm under various channel conditions. In other words, for particular channel conditions, the interference-suppression algorithm does not converge.

To combat non-convergence, the embodiment of FIG. 3 comprises a predetermined alpha-beta sequence that improves convergence. Unlike the complicated eigenvalue-based approaches proposed by others, the alpha-beta sequence implemented in the embodiment of FIG. 3 provides a simpler approach in which different weighting factors are applied at different iterations of the channel-signal-estimation process. By applying variable weighting factors at the different iteration stages, the embodiment of FIG. 3 is less susceptible to the non-convergence issues associated with traditional Jacobi-based approaches.

By way of comparison, the traditional Jacobi-based approach shows the symbol estimation for each iteration as being represented by Eq. 4. To avoid the possibility of an ill-defined matrix inversion, Eq. 4 can be re-written as an alpha-beta-weighted equation, such as:

$$b_{n+1} = \alpha_n R^H(y - Rb_n) + \beta_n b_n \qquad [\text{Eq. 7}]$$

where $\alpha_n$ and $\beta_n$ are weighted variables that are non-constant during the iterations.

Figure 6:
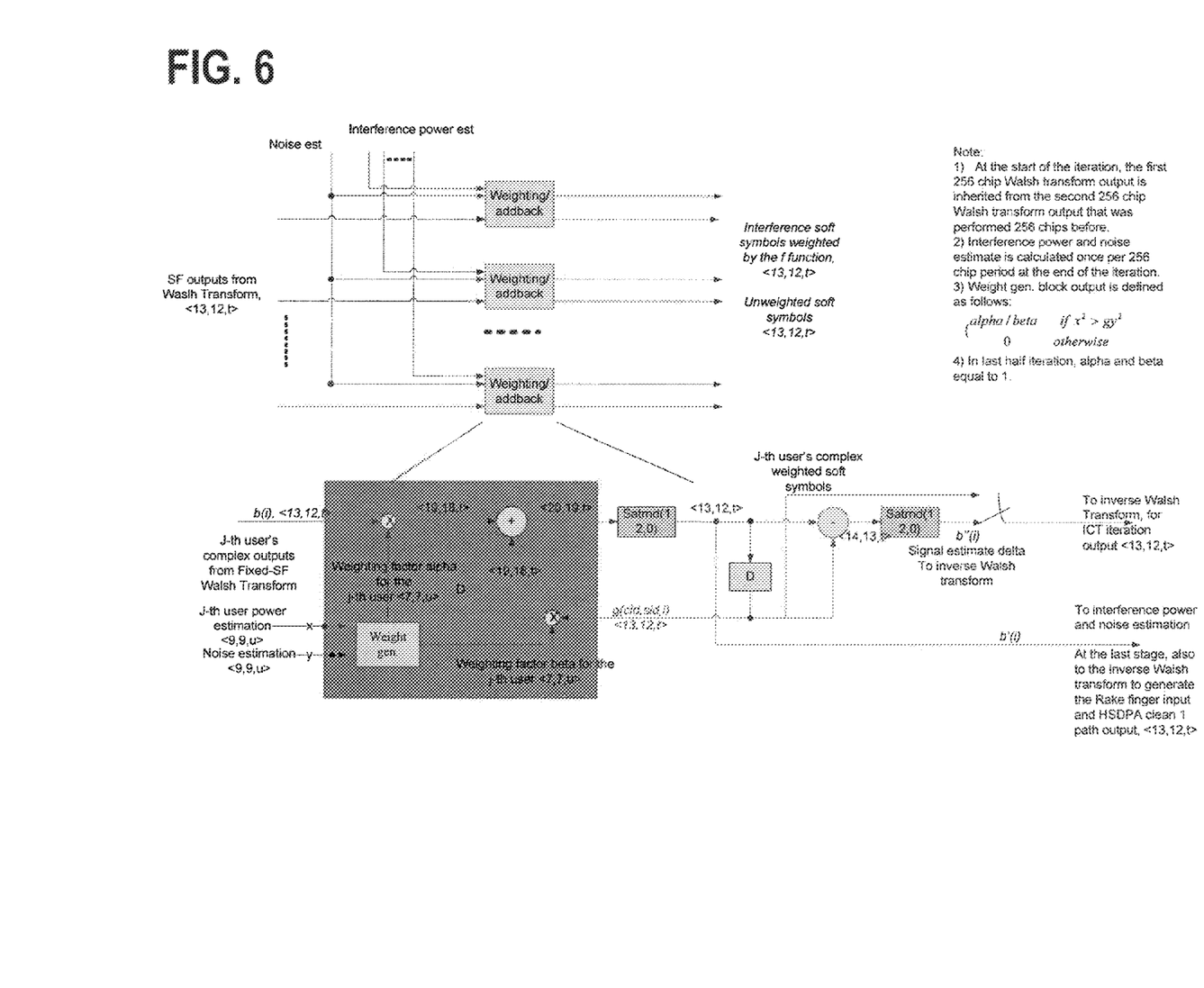
FIG. 6 is a block diagram showing an example circuit for implementing the variable-weight-based alpha-beta iteration, as described with reference to FIG. 3.

By way of example, designating $\sigma$ to be an estimate of noise, S to be an estimate of signal power, and w to be a variable scaling factor, the weighting variables $\alpha_n$ and $\beta_n$ can be defined as:

$$\alpha_n = w_n \cdot \left( \frac{\sigma_n^2}{\sigma_n^2 + S_n^2} \right) \qquad [\text{Eq. 8}]$$

$$\beta_n = (1 - w_n) \cdot \left( \frac{S_n^2}{\sigma_n^2 + S_n^2} \right) \qquad [\text{Eq. 9}]$$

for $\sigma_n^2 > S_n^2$, with w varying for each iteration but being bounded to the range of [0, 1], and:

$$\alpha_n = 0 \qquad [\text{Eq. 10}]$$

$$\beta_n = 0 \qquad [\text{Eq. 11}]$$

for $\sigma_n^2 \leq S_n^2$. In other words, $\alpha_n$ represents a weighting factor that is applied on an estimated signal, while $\beta_n$ represents a weighting factor that is applied on a feedback signal. Thus, as one can see from Eqs. 8, 9, 10, and 11, different weight factors are applied to the feedback signal and the estimated signal. One circuit for implementing such a variable alpha-beta weighting is shown and described in association with FIG. 6. Insofar as one having ordinary skill in the art will understand the operation of the circuit in FIG. 6, only a brief explanation of FIG. 6 is provided herein. Specifically, outputs from the Hadamard transform (or Walsh transform), which comprise a noise estimate and an interference power estimate, are input to the weighting-and-addback blocks. The weighting-and-addback blocks output either unweighted soft symbols or interference soft symbols weighted by the alpha-beta function. It should be appreciated that, at the start of the iteration for a 256-chip system, the first 256-chip Hadamard transform output is inherited from the second 256-chip Hadamard transform output that was performed in the previous 256 chips. And, the interference power and nose estimates are calculated once per 256 chip period at the end of the iteration.

Figure 7:
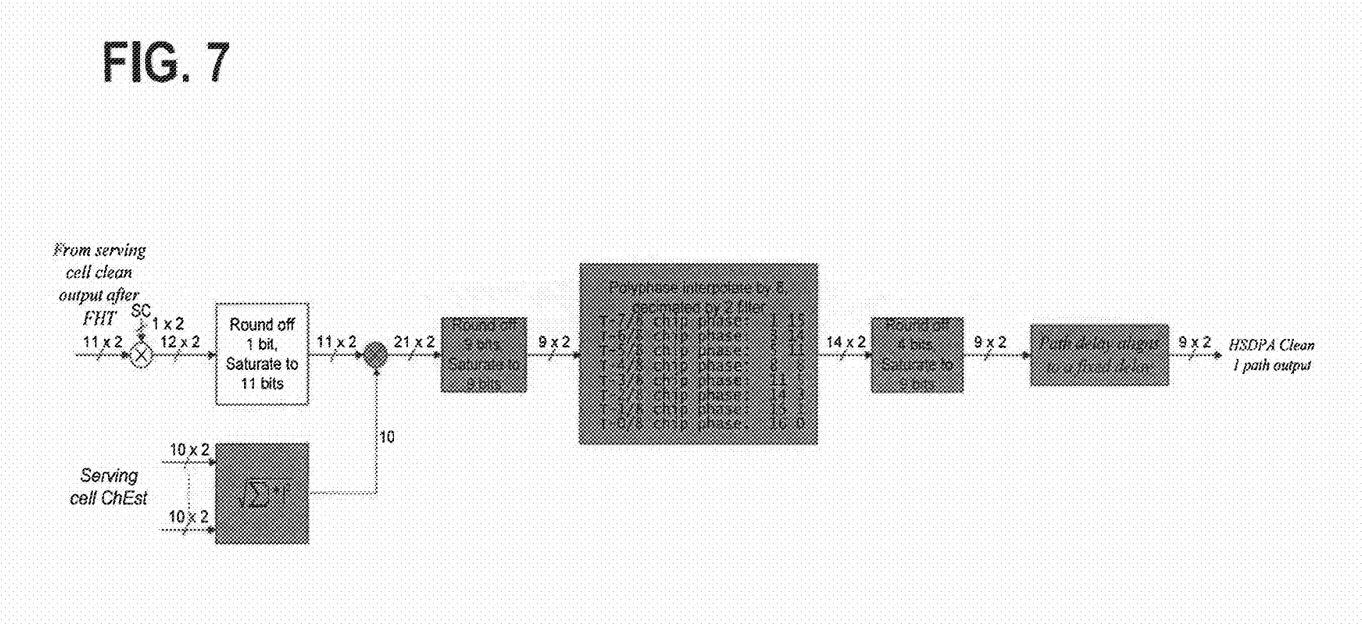
FIG. 7 is a block diagram showing an example of a one-path clean high-speed downlink packet access (HSDPA) output, as described with reference to FIG. 3.

Continuing, in order to apply a non-constant weight during the iterations, the weight-factor, w, can be defined as a relatively small number at the beginning of the determinations (e.g., calculations), and gradually increased with each subsequent iteration. By way of example, in an eight-iteration calculation, w, may be defined for each iteration as {0.125, 0.25, 0.5, 0.75, 0.75, 0.75, 0.75, 0.75}. Such a variable-weight-based alpha-beta approach can provide convergence similar to a symbol-level equalizer, thereby largely removing the need for equalization after the PRISM 102. This permits output of a clean signal to the HSDPA path. A preferred embodiment of a circuit that produces a one-path clean output is shown with reference to FIG. 7. Insofar as one having ordinary skill in the art will understand the operation of the circuit in FIG. 7, a detailed explanation of FIG. 7 is omitted herein.

With that said, attention is turned to FIG. 3, which shows a block diagram with relevant processing modules in a cell that employs a variable-weight-based alpha-beta approach using a parallel interference cancellation (PIC) module 302. For the embodiment of FIG. 3, the ChEst output from the pre-EQ 108 is obtained from consecutive chip-spaced (or half-chip-spaced) fingers (or taps), which are provided by the CPP 112.

FIG. 3 includes various components (Pre-EQ 108, decimation control module 110, CPP 112, DMM 114, DSCH despreader 120, SCCH despreader 122, HS-SCCH decoding module 124, BLP module 126, and HTDM module 128) that have already been described with reference to FIG. 1. As such, a detailed description of those particular components is omitted with reference to FIG. 3.

Unlike the embodiment of FIG. 1, the embodiment of FIG. 3 includes an alpha-beta PIC module 302. In one embodiment, the alpha-beta PIC module 302 receives the ChEst from the CPP 112 and performs the iterative-variable-weight calculations of $\alpha_n$ and $\beta_n$, as set forth in Eqs. 7, 8, 9, 10, and 11. A non-limiting example circuit for implementing the alpha-beta weighting is shown with reference to FIG. 6. As one can see from FIG. 6, the variable alpha is applied on the recursive calculations of the estimated signal, while the variable beta is applied on the recursive calculations of the feedback signal. Also, as can be seen from the particular embodiment of FIG. 7, the eight recursive calculations allow for a cleaner one-path output for the HSDPA pathway.

To the extent that $\alpha_n$ and $\beta_n$ are non-constant for the iterations, the embodiments of FIGS. 3, 6, and 7 provide for better convergence than conventional Jacobi-based iterations. Additionally, to the extent that $\alpha_n$ and $\beta_n$ are not based on eigenvalue decomposition and complicated optimization processes, the embodiments of FIGS. 3, 6, and 7 enable a more streamlined approach to symbol estimation and interference cancellation.

Although the particular embodiment of the PIC module 302 in FIG. 3 shows it as a unit that handles 256 chips, it should be appreciated that the PIC module 302 can be configured for any number of chips, preferably (for computational purposes) a number that is $2^n$.

2. Convergence-Guaranteed Successive Interference Suppression (SIC)

Another approach to solving the non-convergence issue is to employ Gauss-Seidel iterations in a successive interference suppression (SIC) module. To the extent that the signal matrix that is being inverted is positive-definite-Hermitian-symmetric, the Gauss-Seidel iteration always guarantees convergence. Specifically, as noted above, an MMSE algorithm is applied to Eq. 1. The quantity within the parenthesis of Eq. 1 can be defined as:

$$(R^H R + \sigma^2 A^{-2}) = C = L + U, \qquad [\text{Eq. 12}]$$

where C represents the matrix that is to be inverted in the symbol-level-equalization process, L represents the lower triangular matrix of C, and U represents the strictly upper triangular matrix of C.

Substituting Eq. 12 into Eq. 1, the channel estimation equation can be re-written as:

$$b_{n+1} = L^{-1}(R^H y - U b_n), \qquad [\text{Eq. 13}]$$

which is positive-definite-Hermitian-symmetric. Thus, employing a Gauss-Seidel iteration, Eq. 13 can be represented as:

$$b_{n+1}^{(i)} = \frac{1}{c_{ii}}\left((R^H y)^{(i)} - \sum_{j>i} c_{ij} b_n^{(j)} - \sum_{j<i} c_{ij} b_{n+1}^{(j)}\right)$$ [Eq. 14]

where c represents the entries of matrix C. This Gauss-Seidel approach can be implemented in a successive interference cancellation (SIC) module, such as that shown in FIG. 4.

FIG. 4 also includes various components (Pre-EQ 108, decimation control module 110, CPP 112, DMM 114, DSCH despreader 120, SCCH despreader 122, HS-SCCH decoding module 124, BLP module 126, and HTDM module 128) that have already been described with reference to FIG. 1. As such, a detailed description of those particular components is omitted with reference to FIG. 4.

Unlike the embodiment of FIG. 1, however, the embodiment of FIG. 4 comprises a multi-user detection (MUD) matrix formulation module 402 that is operatively coupled to a serial interference cancellation (SIC) module 404. The MUD matrix formulation module 402 receives the ChEst from the CPP 112 and provides a matrix of channels to the SIC module 404. The SIC module 404 recursively performs the Gauss-Seidel iterations of Eqs. 12, 13, and 14 on the received matrix until it converges to a solution. As discussed above, since the input matrix is positive-definite-Hermitian-symmetric, the SIC module 404 will always converge, unlike the conventional Jacobi-based iterations.

Although the particular embodiments of the MUD matrix formulation module 402 and the SIC module 404 in FIG. 4 show them as being configured for 256 chips, it should be appreciated that, similar to the PIC module 302 of FIG. 3, these modules 402, 404 can be configured for any number of chips, preferably (for computational purposes) a number that is $2^n$.

3. Hybrid Interference Suppression

Having described both an alpha-beta-based PIC approach (FIGS. 3, 6, and 7) and a Gauss-Seidel-based SIC approach (FIG. 4), attention is turned now to FIG. 5, which shows relevant processing modules in a cell that employs a hybrid (PIC+SIC) approach.

Again, the embodiment of FIG. 5 includes components that have already been discussed, above (e.g., Pre-EQ 108, decimation control module 110, CPP 112, DMM 114, SCCH despreader 122, HS-SCCH decoding module 124, BLP module 126, and HTDM module 128). As such, a detailed description of those particular components is omitted with reference to FIG. 5.

The embodiment of FIG. 5 includes an alpha-beta-weighted PIC module 502, a MUD matrix formulation module 504, and an SIC module 506. Unlike the PIC module 302 of FIG. 3, the PIC module 502 of FIG. 5 provides a dual output, namely, one for CPICH and DSCH and another for SCCH.

In operation, the CPP 112 provides the ChEst to the MUD matrix formulation module 504. It should be noted that the MUD matrix formulation module 504 of FIG. 5 is unlike the MUD matrix formulation module 402 of FIG. 4. Specifically, the MUD matrix formulation module 504 of FIG. 5 is configured as a 16-chip module, as compared to the 256-chip module 402 of FIG. 4. The reason being that the hybrid approach of FIG. 5 allows alpha-beta PIC module 502 to provide an initial calculation of the symbol estimate, and then uses the SIC module 506 to guarantee convergence. As such, the hybrid approach finds a balance between the weighted alpha-beta approach of FIG. 3 and the guaranteed-convergence approach of FIG. 4.

As noted above, the alpha-beta PIC module 502 has two outputs, namely: (a) one output for the control channel (e.g., SCCH); and (b) another output for the data channel (e.g., CPICH and DSCH). The SCCH output follows the SCCH pathway, including the SCCH despreader 122 and the HS-HS-SCCH decoding module 124. The CPICH and DSCH output provides the data, which has been processed by the PIC module 502, to the SIC module 506 so that the SIC module 506 can complete the interference cancellation using the Gauss-Seidel iterations. To the extent that the alpha-beta estimation and the Gauss-Seidel estimation are described with reference to FIGS. 3 and 4, respectively, further discussion of those two approaches is omitted with reference to FIG. 5.

As shown in FIGS. 1 through 5, conventional interference suppression approaches are improved through the addition of intra-cell interference suppression modules, and refinements in the signal-processing algorithms. These refinements allow for superior performance when compared to conventional interference-suppression devices.

The various processing modules (e.g., PRISM, intra-cell cancellation unit, code gate, etc.) disclosed herein may be implemented in hardware, software, firmware, or a combination thereof. In the preferred embodiment(s), the processing modules are implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), a digital signal processor (DSP), a vector computing unit, etc. In an alternative embodiment, the processing modules are implemented in software or firmware that is stored in a memory and that is executed by a suitable instruction execution system.

To the extent that the operation of various modules are represented by mathematical equations, it should be appreciated that those equations may be practically implemented in both software and hardware. In the event that the processing modules are implemented in software, which comprises an ordered listing of executable instructions for implementing logical functions, each of the processing modules can be embodied in any non-transient computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

Although exemplary embodiments have been shown and described, it will be clear to those of ordinary skill in the art that a number of changes, modifications, or alterations to the disclosure as described may be made. For example, while specific algorithms are disclosed to better illustrate the inventive concepts, it should be appreciated that the invention is not limited to the particular equations. Instead, it should be appreciated that those specific equations are intended to illustrate the best mode for their corresponding embodiments. As such, one having skill in the art will appreciate that other similar equations can be used without deviating from the scope of the claims set forth herein. Also, while representative processing modules are illustrated in the drawings, it should be appreciated that the invention is not limited to the precise processing modules disclosed. Furthermore, for purposes of this disclosure, the phrase interference-suppression and interference-cancellation are used interchangeably, unless the context dictates otherwise. All such changes, modifications, and alterations should therefore be seen as within the scope of the disclosure.

What is claimed is:

1. A system for suppressing interference, comprising:
   an interference suppression module configured to iteratively determine an estimated interference;
   a first circuit configured to apply a first weight to an estimated signal at each iteration, wherein the first weight is non-constant over each iteration; and
   a second circuit configured to apply a second weight to a feedback signal at each iteration, wherein the second weight is non-constant over each iteration and the feedback signal comprises code allocation information,
   wherein the first weight and the second weight are each based at least in part on a variable scaling factor that is non-constant for each iteration and that increases after a first iteration.

2. The system of claim 1, wherein the interference suppression module comprises a parallel interference cancellation (PIC).

3. The system of claim 2, wherein the PIC module is configured to iteratively determine the estimated interference based on consecutive chip-spaced rake fingers.

4. The system of claim 1, wherein the interference suppression module is further configured to iteratively determine the estimated interference based on:

$$b_{n+1} = \alpha_n R^H(y - Rb_n) + \beta_n b_n, \text{ wherein:}$$

$\alpha_n$ is the first weight;
   $\beta_n$ is the second weight;
   $b_n$ represents the estimated signal at a prior iteration;
   $b_{n+1}$ represents the estimated signal at a current iteration;
   y represents a vector of received chip-level signals; and
   R and $R^H$ represent matrices that provide an estimate of a symbol.

5. The system of claim 4, wherein:

$$\alpha_n = w_n \cdot \left(\frac{\sigma_n^2}{\sigma_n^2 + S_n^2}\right) \text{ and } \beta_n = (1 - w_n) \cdot \left(\frac{S_n^2}{\sigma_n^2 + S_n^2}\right)$$

for $\sigma_n^2 > S_n^2$; and $\alpha_n = 0$ and $\beta_n = 0$ for $\sigma_n^2 \leq S_n^2$;

wherein:
   w is the variable scaling factor that is non-constant for each iteration, w being bounded to a range of [0, 1];
   $\sigma$ represents an estimate of noise; and
   S represents an estimate of signal power.

6. The system of claim 1, wherein the variable scaling factor is bound to of a range of [0, 1].

7. A system for suppressing interference, comprising:
   a multi-user detection (MUD) matrix formulation module configured to receive a channel estimate and produce a matrix of channels;
   an alpha-beta parallel interference cancellation (PIC) module configured to receive the matrix of channels and provide an initial estimate of interference based at least in part on the matrix of channels by applying a first weight to an estimated signal at each iteration, wherein the first weight is non-constant over each iteration, and applying a second weight to a feedback signal at each iteration, wherein the second weight is non-constant over each iteration and the feedback signal comprises code allocation information; and
   a successive interference cancellation (SIC) module configured to receive the initial estimate of interference and determine a final estimate of interference based at least in part on the initial estimate of interference, wherein the final estimate of interference is determined based at least in part on a Gauss-Seidel iteration,
   wherein the first weight and the second weight are each based at least in part on a variable scaling factor that is non-constant for each iteration and that increases after a first iteration.

8. The system of claim 7, wherein the SIC module is configured to estimate the interference based on:

$$b_{n+1} = L^{-1}(R^H y - U b_n), \text{ wherein:}$$

$b_n$ represents the estimated signal at a prior iteration;
   $b_{n+1}$ represents the estimated signal at a current iteration;
   y represents a vector of received chip-level signals; and
   $R^H$ represents a matrix that provides an estimate of a symbol;
   L represents a lower triangular matrix of C;
   C represents a matrix that is to be inverted in a symbol-level equalization process; and
   U represents a strictly upper triangular matrix of C.

9. The system of claim 8, wherein $b_{n+1}$ is further determined based on:

$$b_{n+1}^{(i)} = \frac{1}{c_{ii}}\left((R^H y)^{(i)} - \sum_{j>i} c_{ij} b_n^{(j)} - \sum_{j<i} c_{ij} b_{n+1}^{(j)}\right),$$

wherein c represents entries of C.

10. The system of claim 7, wherein the matrix of channels comprises a Hermitian positive definite matrix.

11. The system of claim 7, wherein the variable scaling factor is bound to of a range of [0, 1].

12. A system for suppressing interference, comprising:
   an alpha-beta parallel interference cancellation (PIC) module configured to provide an initial estimate of interference by applying a first weight to an estimated signal at each iteration, wherein the first weight is non-constant over each iteration, and applying a second weight to a feedback signal at each iteration, wherein the second weight is non-constant over each iteration and the feedback signal comprises code allocation information; and
   a Gauss-Seidel successive interference cancellation (SIC) module configured to receive the initial estimate of the interference from the alpha-beta PIC module and determine a final estimate of the interference based at least in part on the initial estimate of the interference, wherein the first weight and the second weight are each based at least in part on a variable scaling factor that is non-constant for each iteration and that increases after a first iteration.

13. The system of claim 12, wherein the interference is intra-cell interference.

14. The system of claim 12, wherein the interference is inter-cell interference.

15. The system of claim 12, wherein the PIC module is further configured to iteratively determine the initial estimate of the interference.

16. The system of claim 12, wherein the SIC module is further configured to iteratively determine the final estimate of the interference.

17. The system of claim 12, wherein the PIC module is further configured to iteratively determine estimated interference based on consecutive chip-spaced rake fingers.

18. The system of claim 17, wherein the alpha-beta PIC module is configured to iteratively determine the estimated interference based on:

$$b_{n+1} = \alpha_n R^H(y - Rb_n) + \beta_n b_n, \text{ wherein:}$$

$\alpha_n$ is the first weight;
$\beta_n$ is the second weight;
$b_n$ represents the estimated signal at a prior iteration;
$b_{n+1}$ represents the estimated signal at a current iteration;
y represents a vector of received chip-level signals; and
R and $R^H$ represent matrices that provide an estimate of a symbol.

19. The system of claim 18, wherein the alpha-beta PIC module is further configured to determine the estimated interference based on:

$$\alpha_n = w_n \cdot \left( \frac{\sigma_n^2}{\sigma_n^2 + S_n^2} \right) \text{ and } \beta_n = (1 - w_n) \cdot \left( \frac{S_n^2}{\sigma_n^2 + S_n^2} \right)$$

for $\sigma_n^2 > S_n^2$; and $\alpha_n = 0$ and $\beta_n = 0$ for $\sigma_n^2 \leq S_n^2$;

wherein:
w is the variable scaling factor that is non-constant for each iteration, w being bounded to a range of [0, 1];
$\sigma$ represents an estimate of noise; and
S represents an estimate of signal power.

20. The system of claim 12, wherein the SIC module is configured to estimate a final interference based on:

$$b_{n+1} = L^{-1}(R^H y - Ub_n), \text{ wherein:}$$

$b_n$ represents the estimated signal at a prior iteration;
$b_{n+1}$ represents the estimated signal at a current iteration;
y represents a vector of received chip-level signals; and
$R^H$ represents a matrix that provides an estimate of a symbol;
L represents a lower triangular matrix of C;
C represents a matrix that is to be inverted in a symbol-level equalization process; and
U represents a strictly upper triangular matrix of C.

21. The system of claim 19, wherein $b_{n+1}$ is further determined based on:

$$b_{n+1}^{(i)} = \frac{1}{c_{ii}} \left( (R^H y)^{(i)} - \sum_{j>i} c_{ij} b_n^{(j)} - \sum_{j<i} c_{ij} b_{n+1}^{(j)} \right),$$

wherein c represents entries of C.

* * * * *